United States Patent
Sasaki et al.

(10) Patent No.: US 9,696,557 B2
(45) Date of Patent: Jul. 4, 2017

(54) OPTICAL DEVICE

(71) Applicant: KABUSHIKI KAISHA TOSHIBA, Tokyo (JP)

(72) Inventors: Takashi Sasaki, Kanagawa (JP); Kazuo Horiuchi, Kanagawa (JP); Haruhiko Okumura, Kanagawa (JP); Tomoya Tsuruyama, Kanagawa (JP); Aira Hotta, Kanagawa (JP); Yoshiyuki Kokojima, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 14/789,098

(22) Filed: Jul. 1, 2015

(65) Prior Publication Data

US 2016/0025989 A1 Jan. 28, 2016

(30) Foreign Application Priority Data

Jul. 25, 2014 (JP) .................................. 2014-151495

(51) Int. Cl.
*G02B 27/22* (2006.01)
*G02B 27/01* (2006.01)

(52) U.S. Cl.
CPC ..... *G02B 27/2221* (2013.01); *G02B 27/0101* (2013.01); *G02B 2027/013* (2013.01)

(58) Field of Classification Search
CPC ............ G02B 27/2292; G02B 27/2221; G02B 27/2214; G02B 27/2235; G02B 27/0101; G02B 17/0856; G02B 5/124; G02B 5/136; G02B 2027/013; G02B 27/24

USPC .................................................. 359/478, 479
See application file for complete search history.

(56) References Cited

U.S. PATENT DOCUMENTS

| | | | | |
|---|---|---|---|---|
| 5,087,116 A | * | 2/1992 | Taylor, II | ................. G02B 5/10 359/851 |
| 6,023,369 A | * | 2/2000 | Goto | .................... G03B 21/602 359/443 |
| 2009/0237803 A1 | | 9/2009 | Hotta et al. | |
| 2009/0243963 A1 | | 10/2009 | Hotta | |

(Continued)

FOREIGN PATENT DOCUMENTS

| | | |
|---|---|---|
| JP | H10-62870 | 3/1998 |
| JP | 2003-287809 | 10/2003 |

(Continued)

*Primary Examiner* — Jade R Chwasz
(74) *Attorney, Agent, or Firm* — Nixon & Vanderhye, P.C.

(57) ABSTRACT

An example optical device includes a first optical element and a second optical element. The first optical element has first and second surfaces. A first light emitted by a display is incident on the first surface. The first optical element includes transmissive portions and non-transmissive portions. Each of the transmissive portions extends in a first direction parallel to the first surface. The non-transmissive portions are respectively disposed in regions between the transmissive portions. A light transmittance of the non-transmissive portions is lower than that of the transmissive portions. A second light emitted from the second surface is incident on the second optical element, which emits a third light by condensing the second light. An optical axis of the third light is tilted with respect to an optical axis of the second light in a plane parallel to the first direction.

16 Claims, 11 Drawing Sheets

(56) References Cited

U.S. PATENT DOCUMENTS

| | | | |
|---|---|---|---|
| 2010/0214635 A1 | 8/2010 | Sasaki et al. |
| 2011/0001639 A1 | 1/2011 | Sasaki et al. |
| 2012/0200677 A1 | 8/2012 | Saishu et al. |

FOREIGN PATENT DOCUMENTS

| | | |
|---|---|---|
| JP | 2005-266487 | 9/2005 |
| JP | 2006-11076 | 1/2006 |
| JP | 2009-128565 | 6/2009 |
| JP | 2009-229752 | 10/2009 |
| JP | 2009-244355 | 10/2009 |
| JP | 2009-246505 | 10/2009 |
| JP | 2011-164631 | 8/2011 |
| JP | 2012-163709 | 8/2012 |

\* cited by examiner

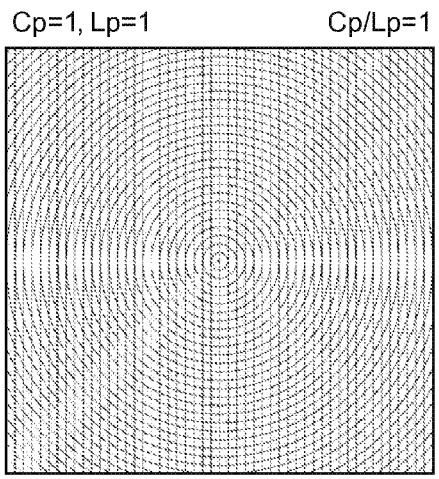
FIG. 10A
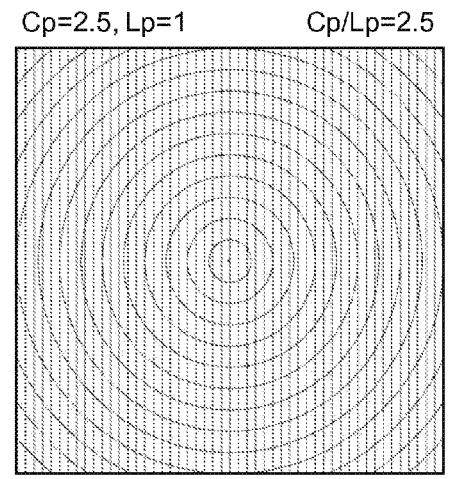
FIG. 10B
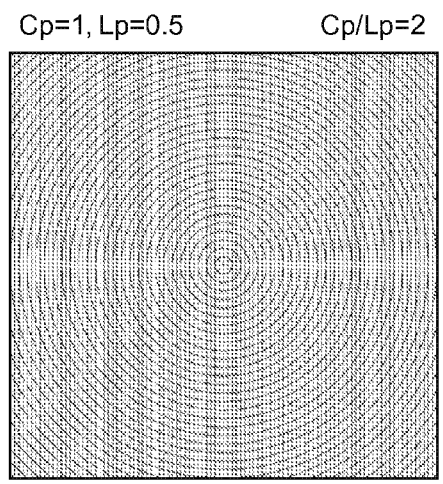
FIG. 10C
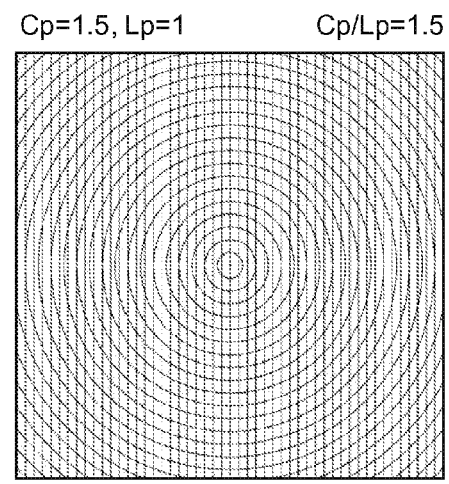
FIG. 10D
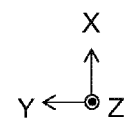

OPTICAL DEVICE

CROSS-REFERENCE TO RELATED APPLICATIONS

This application is based upon and claims the benefit of priority from Japanese Patent Application No. 2014-151495, filed on Jul. 25, 2014; the entire contents of which are incorporated herein by reference.

FIELD

Embodiments described herein relate generally to an optical device.

BACKGROUND

Displays are provided in portable communication devices, computers, etc. New applications of such displays are desirable.

BRIEF DESCRIPTION OF THE DRAWINGS

FIG. 10A to FIG. 10D are schematic plan views showing characteristics of the optical device;

DETAILED DESCRIPTION

Figure 1:
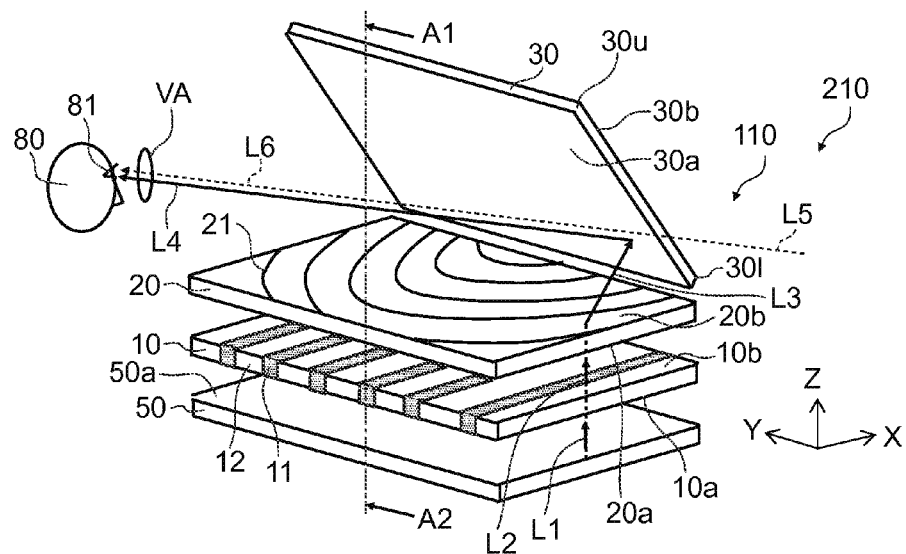
FIG. 1 is a schematic perspective view showing an optical device according to a first embodiment.

According to one embodiment, an optical device includes a first optical element and a second optical element. The first optical element has a first surface and a second surface. A first light emitted by a display is incident on the first surface. The first optical element includes a plurality of transmissive portions and a plurality of non-transmissive portions. Each of the transmissive portions extends in a first direction parallel to the first surface, and the non-transmissive portions are respectively disposed in regions between the transmissive portions. A light transmittance of the non-transmissive portions is lower than a light transmittance of the transmissive portions. A second light emitted from the second surface is incident on the second optical element, and the second optical element emits a third light by condensing the second light. An optical axis of the third light is tilted with respect to an optical axis of the second light in a plane parallel to the first direction.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic perspective view illustrating an optical device according to a first embodiment.

Figure 2:
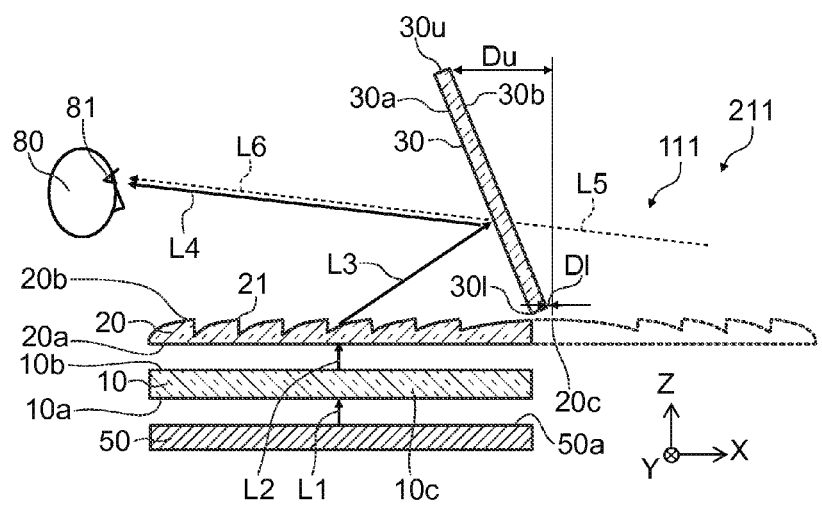
FIG. 2 is a schematic cross-sectional view showing the optical device according to the first embodiment.

FIG. 2 is a schematic cross-sectional view illustrating the optical device according to the first embodiment.

FIG. 2 is a line A1-A2 cross-sectional view of FIG. 1.

As shown in FIG. 1 and FIG. 2, the optical device 110 according to the embodiment includes a first optical element 10 and a second optical element 20. A third optical element 30 is provided in the example. The third optical element 30 may be included in the optical device 110 or may be provided separately from the optical device 110.

The optical device 110 is used with a display 50 (a display device). For example, the optical device 110 is disposed on the display 50. The display 50 and the optical device 110 are included in a display system 210.

The display 50 is, for example, a portable display. A portable communication device (a mobile telephone, a smartphone, or the like), a portable personal computer, or the like is used as the display 50. The display 50 includes a single display device that outputs image information received from the outside. In the embodiment, the display 50 is arbitrary.

The display 50 has a display surface 50a. Light (a first light L1) that includes a display image is emitted from the display surface 50a.

For example, the first optical element 10 is disposed on the display surface 50a of the display 50.

The first optical element 10 has a first surface 10a and a second surface 10b. The first light L1 that is emitted from the display surface 50a is incident on the first surface 10a. The second surface 10b is different from the first surface 10a. The second surface 10b is the surface on the side opposite to the first surface 10a. The first light L1 is incident on the first surface 10a, passes through the first optical element 10, and is emitted from the second surface 10b. A second light L2 is the light emitted from the second surface 10b.

The first optical element 10 includes multiple transmissive portions 12 and multiple non-transmissive portions 11. Each of the multiple transmissive portions 12 extends along a first direction. The first direction is parallel to the first surface 10*a*. The multiple transmissive portions 12 are arranged in a second direction. The second direction is parallel to the first surface 10*a* and perpendicular to the first direction.

The first direction is taken as an X-axis direction. The second direction is taken as a Y-axis direction. A direction perpendicular to the X-axis direction and the Y-axis direction is taken as a Z-axis direction.

The multiple non-transmissive portions 11 are respectively disposed in the regions between the multiple transmissive portions 12. The light transmittance of the multiple non-transmissive portions 11 is lower than the light transmittance of the multiple transmissive portions 12.

The transmissive portions 12 are, for example, openings. The non-transmissive portions 11 are, for example, light-shielding portions. The spread of the second light L2 emitted from the first optical element 10 is different between the first direction (the X-axis direction) and the second direction (the Y-axis direction). The spread of the second light L2 along the second direction is caused to be narrower than the spread of the second light L2 along the first direction by the first light L1 passing through the first optical element 10. Examples of the configuration and characteristics of the first optical element 10 are described below.

The second optical element 20 is disposed on the first optical element 10. The second light that is emitted from the second surface 10*b* of the first optical element 10 is incident on the second optical element 20. The second optical element 20 has a third surface 20*a* and a fourth surface 20*b*. The third surface 20*a* opposes the second surface 10*b*. The third surface 20*a* is, for example, substantially parallel to the X-Y plane. The second light L2 is incident on the third surface 20*a*. The fourth surface 20*b* is different from the third surface 20*a*. The fourth surface 20*b* is a surface on the side opposite to the third surface 20*a*. The light (the second light L2) that is incident on the third surface 20*a* passes through the second optical element 20 and is emitted from the fourth surface 20*b*. The light that is emitted from the fourth surface 20*b* is a third light L3.

The second optical element 20 condenses the second light L2 and emits the condensed second light L2 as the third light L3. Further, the second optical element 20 causes the optical axis of the third light L3 to be tilted with respect to the optical axis of the second light L2. The direction of the tilt is parallel to the first direction. The direction of the tilt is perpendicular to the second direction. The major axis of the third light L3 is, for example, parallel to the X-Z plane. Thus, the second optical element 20 causes the optical axis of the third light L3 to be tilted with respect to the optical axis of the second light L2 in a plane parallel to the first direction.

For example, the optical axis of the chief ray of the third light L3 is tilted with respect to (non-parallel to) the optical axis of the chief ray of the second light L2. The optical axis of the chief ray of the third light L3 and the optical axis of the chief ray of the second light L2 are parallel to a plane (the X-Z plane) perpendicular to the second direction.

The third light L3 that is tilted is incident on the third optical element 30, is reflected by the third optical element 30, and reaches a viewer 80. The viewer 80 views the display 50 (the display system 210). The viewer 80 is the user of the optical device 110. The third optical element 30 is, for example, a combiner.

In other words, the second optical element 20 emits the third light L3 toward the third optical element 30 provided to be tilted with respect to the first surface 10*a*.

The third optical element 30 has a fifth surface 30*a* and a sixth surface 30*b*. The sixth surface 30*b* is different from the fifth surface 30*a*. The sixth surface 30*b* is the surface on the side opposite to the fifth surface 30*a*.

The third light L3 that is emitted from the second optical element 20 is reflected by the fifth surface 30*a*. The light that is reflected by the fifth surface 30*a* is a fourth light L4. The fourth light L4 travels toward the viewer 80. In other words, the third light L3 is reflected by the third optical element 30 and is incident on the viewer.

For example, the fourth light L4 that is reflected by the fifth surface 30*a* is incident on one eye 81 of the viewer 80. The fourth light L4 is not incident on the other eye of the viewer 80.

The viewer 80 can view the incident fourth light L4 only with the one eye 81 and cannot view the fourth light L4 with the other eye. The perception of depth is enhanced by viewing using only one eye. Further, the display is easier to view because parallax does not occur.

Thus, the third optical element 30 is reflective. The third optical element 30 may also be light-transmissive. In other words, the third optical element 30 may be half-transmissive/half-reflective.

In such a case, a fifth light L5 that includes the background image passes through the third optical element 30. For example, the fifth light L5 that includes the background image is incident on the sixth surface 30*b*, passes through the third optical element 30, and is emitted from the fifth surface 30*a*. A sixth light L6 that is emitted from the fifth surface 30*a* travels toward the viewer 80. The sixth light L6 is incident on both the one eye 81 and the other eye of the viewer 80.

Thus, according to the embodiment, the optical device includes a first optical element and a second optical element. The first optical element has a first surface on which the first light emitted by the display is incident, and a second surface that is different from the first surface. The first optical element includes multiple transmissive portions and multiple non-transmissive portions. Each of the multiple transmissive portions extends in a first direction parallel to the first surface. The multiple non-transmissive portions are respectively disposed in regions between the multiple transmissive portions. The light transmittance of the multiple non-transmissive portions is lower than the light transmittance of the multiple transmissive portions. The second light that is emitted from the second surface is incident on the second optical element. The second optical element emits a third light by condensing the second light; and the optical axis of the third light is tilted with respect to the optical axis of the second light in a plane parallel to the first direction.

In the display system 210, the display image that is emitted from the display 50 is incident on the one eye 81 of the viewer 80 but is not incident on the other eye. On the other hand, the background image is incident on both eyes of the viewer. The viewer 80 views the display image as being superimposed with the background image. The depth is perceived because the background image is viewed with both eyes. On the other hand, because the display image that is superimposed with the background image is viewed by only the one eye 81, it is easy to perceive the display image at the depthward position of the superimposed background image. In other words, the perception of the display image relating to the depth is enhanced.

Thus, in the embodiment, new applications of the display 50 are possible in addition to the normal method for using the display 50 by directly viewing the display 50. In such a new application, for example, the display image is reflected by the third optical element 30 and perceived as being superimposed with the background image.

It is desirable for the display 50 to be mounted to be substantially horizontal as viewed by the viewer 80. The third optical element 30 is mounted to be tilted from the horizontal plane to reflect the light emitted from the display 50. In the optical device 110 according to the embodiment, the first optical element 10 and the second optical element 20 are disposed between such a display 50 and such a third optical element 30.

The second optical element 20 causes the light from the display 50 disposed substantially horizontally to be incident on the third optical element 30. In other words, the optical axis is caused to tilt. Thereby, the light from the display 50 disposed horizontally is caused to be incident on the third optical element 30, is reflected, and can be caused to be incident on the viewer 80.

In the embodiment, for example, the display image is perceived by only the one eye 81. To this end, the spread in the lateral direction of the light (the fourth light L4) incident on the viewer 80 is set to be small.

For example, the multiple transmissive portions 12 and the multiple non-transmissive portions 11 are provided in the first optical element 10. Thereby, the first optical element 10 controls the spread of the light (the first light L1) from the display 50 and can set the spread in the lateral direction (corresponding to the second direction) to be small. Thereby, the spread in the lateral direction of the light (the fourth light L4) incident on the viewer 80 can be set to be narrow; and the light can be incident on only the one eye 81 of the viewer 80.

Thus, the first optical element 10 controls the spread of the light and sets the spread of the light to be narrow. Further, the second optical element 20 has a condensing function. In other words, the spread of the light is reduced in the second optical element 20 as well. Thus, the width in the lateral direction of the light (the fourth light L4) incident on the viewer 80 can be set to be narrow by reducing the spread of the light using the second optical element 20 as well as the first optical element 10.

Thus, the second optical element 20 has a function of changing the direction of the optical axis and a function of condensing the light.

The second optical element 20 may include, for example, a Fresnel lens. Thereby, a light condensing function is obtained. By setting the optical center of the Fresnel lens to be shifted from the center of the first optical element 10, the direction of the optical axis can be changed by the second optical element 20.

As shown in FIG. 1 and FIG. 2, the second optical element 20 includes multiple protruding portions 21. The multiple protruding portions 21 are provided on at least one of the third surface 20a or the fourth surface 20b. For example, the multiple protruding portions 21 are provided to be concentric.

Each of the multiple protruding portions 21 has an arc shape when projected onto the third surface 20a (e.g., the X-Y plane). The multiple protruding portions 21 form a Fresnel lens.

As shown in FIG. 2, the second optical element 20 has an optical center 20c. The optical center 20c is shifted from a center 10c of the first optical element 10. The direction of the shift is along the first direction (the X-axis direction).

The center 10c of the first optical element 10 is the center of the first optical element 10 inside the X-Y plane (a plane including the first direction and the second direction). The optical center 20c of the second optical element 20 is separated from the center 10c of the first optical element 10 in the first direction.

Thereby, the optical axis of the third light L3 emitted from the second optical element 20 is tilted with respect to the second light L2; and the third light L3 can be caused to be incident on the third optical element 30.

As illustrated in FIG. 2, the optical center 20c of the second optical element 20 may not be provided inside the second optical element 20. The optical center 20c may be positioned in space to be separated from the second optical element 20. For example, the optical center 20c can be estimated from the position of the focal point when causing parallel light to be incident on the second optical element 20.

For example, the third optical element 30 includes a lower portion 30l and an upper portion 30u. The distance between the upper portion 30u and the first optical element 10 is longer than the distance between the lower portion 30l and the first optical element 10. In such a case, the direction of the shift of the optical center 20c of the second optical element 20 corresponds to the direction from the upper portion 30u toward the lower portion 30l of the third optical element 30. In other words, a distance Du along the first direction between the optical center 20c and the upper portion 30u of the second optical element 20 is longer than a distance Dl along the first direction between the optical center 20c and the lower portion 30l of the second optical element 20.

For example, the orientation of the travel direction of the third light L3 between the second optical element 20 and the third optical element 30 when projected onto the first surface 10a (the X-Y plane) is the same as the orientation of the direction from the upper portion 30u toward the lower portion 30l when projected onto the first surface 10a.

Figure 3:
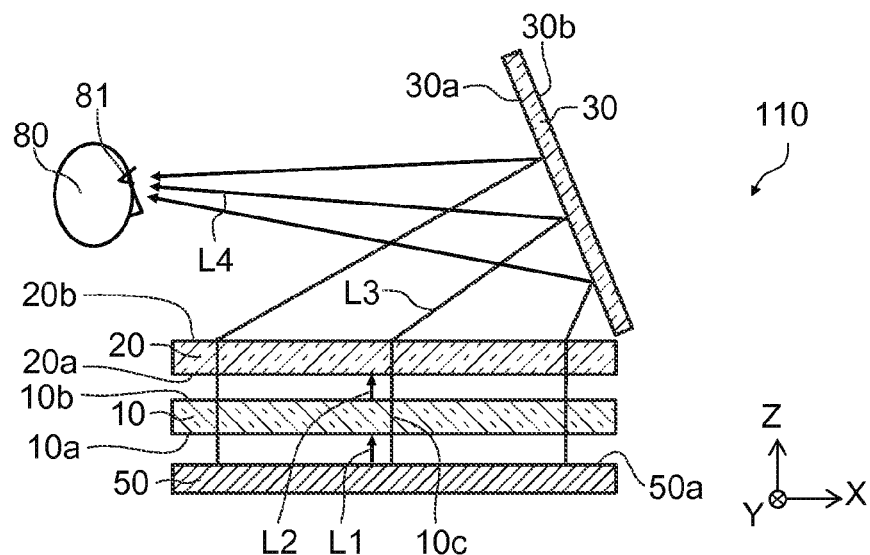
FIG. 3 is a schematic cross-sectional view showing the optical device according to the first embodiment.

FIG. 3 is a schematic cross-sectional view illustrating the optical device according to the first embodiment.

As shown in FIG. 3, the first light L1 that is emitted from the display 50 has a component (e.g., the chief ray) in the Z-axis direction. The first light L1 is incident on the first optical element 10; and the second light L2 is emitted from the first optical element 10. The direction of the component (the chief ray) of the first light L1 in the Z-axis direction does not change even when passing through the first optical element 10. The second light L2 is incident on the second optical element 20; and the third light L3 is emitted from the second optical element 20. The third light L3 is tilted with respect to the Z-axis. The directions of the three light rays shown in FIG. 3 are changed by the third optical element 30, are condensed, and are incident on the viewer 80 as the fourth light L4.

Figure 4:
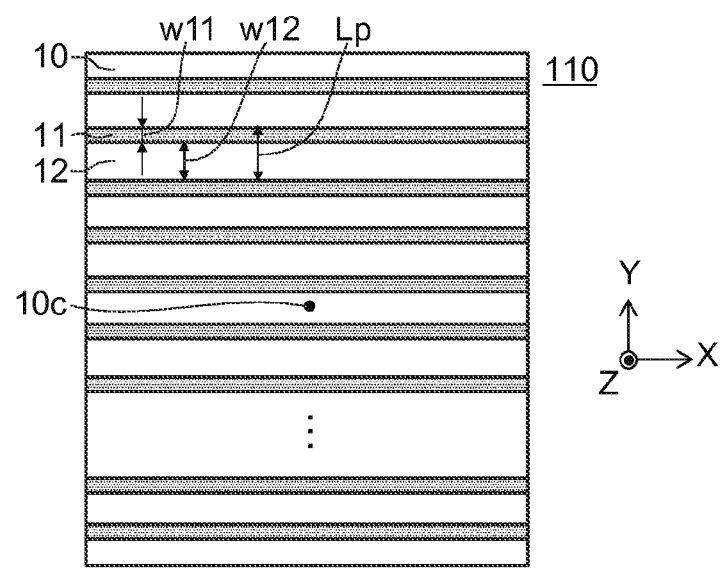
FIG. 4 is a schematic plan view showing the optical device according to the first embodiment.

FIG. 4 is a schematic plan view illustrating the optical device according to the first embodiment.

FIG. 4 illustrates the first optical element 10.

The multiple transmissive portions 12 and the multiple non-transmissive portions 11 are provided as shown in FIG. 4. Each of the multiple transmissive portions 12 includes, for example, at least one of a transparent resin or transparent glass. Each of the multiple non-transmissive portions 11 includes, for example, a metal film.

A width w11 along the second direction (the Y-axis direction) of each of the multiple non-transmissive portions 11 is, for example, 50 micrometers (μm) or more. The width w11 may be 100 μm or more. A width w12 along the second direction of each of the multiple transmissive portions 12 is, for example, not less than 100 μm and not more than 1000 μm. In the case where the width w11 is excessively narrow, for example, the manufacturing is difficult. In the case where the width w11 is excessively wide, for example, the shielding of the transmitted light increases; and the display function when viewing degrades markedly. In the case where the width w12 is excessively narrow, for example, the shielding of the transmitted light by the width w11 increases. In the case where the width w12 is excessively wide, for example, it is difficult to limit the viewing zone (the viewing region) as desired. As a result, it is difficult to view by monocular vision.

Figure 5:
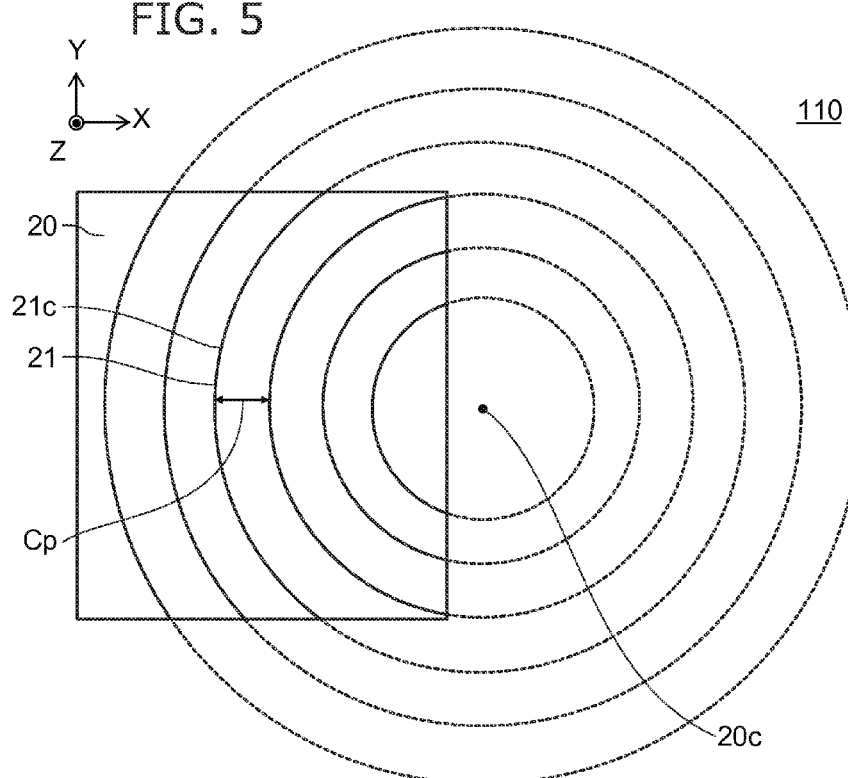
FIG. 5 is a schematic plan view showing the optical device according to the first embodiment

FIG. 5 is a schematic plan view illustrating the optical device according to the first embodiment.

FIG. 5 illustrates the second optical element 20.

In the second optical element 20 as shown in FIG. 5, the multiple protruding portions 21 include a portion that has an arc configuration (an arc shape). In other words, at least one of the multiple protruding portions 21 includes an arc 21a (a circular arc). For example, the multiple protruding portions 21 are provided to be concentric. The center of the concentric circles corresponds to the optical center 20c of the second optical element 20.

A pitch Cp of the multiple protruding portions 21 is, for example, not less than 20 μm and not more than 1000 μm. In the case where the pitch Cp is excessively small, for example, it is difficult to provide the protruding portions 21 with the desired configuration when manufacturing. In the case where the pitch Cp is excessively large, for example, the quality of the image that is obtained decreases.

Figure 6A:
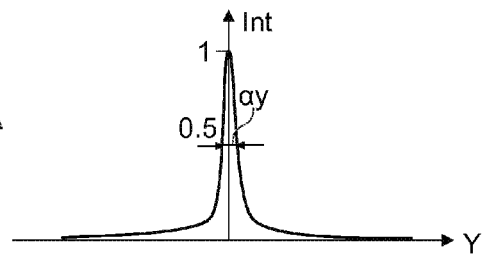
FIG. 6A and FIG. 6B are graphs of characteristics of the optical device according to the first embodiment.
Figure 6B:
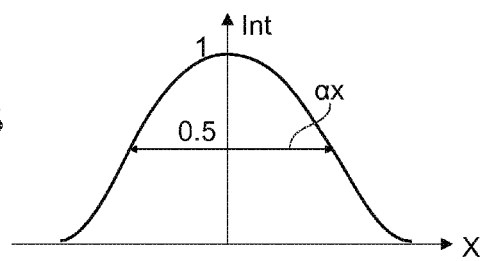

FIG. 6A and FIG. 6B are graphs of characteristics of the optical device according to the first embodiment.

These figures illustrate the spread of the second light L2 emitted from the first optical element 10. FIG. 6A shows the spread of the light in the Y-axis direction; and the horizontal axis is the angle in the Y-axis direction. FIG. 6B shows the spread of the light in the X-axis direction; and the horizontal axis is the angle in the X-axis direction. The vertical axes are relative intensities Int of the light. The Z-axis direction is used as the reference of the angle.

As shown in FIG. 6A, the spread of the light in the Y-axis direction is narrow. As shown in FIG. 6B, the spread of the light in the X-axis direction is wide. A first angle $\alpha x$ is the angle of the full width at half maximum of the second light L2 in the first direction (the X-axis direction). A second angle $\alpha y$ is the angle of the full width at half maximum of the second light L2 in the second direction (the Y-axis direction). The first angle $\alpha x$ is larger than the second angle $\alpha y$. In other words, the second angle $\alpha y$ is smaller than the first angle $\alpha x$. The angle of the full width at half maximum corresponds to the angle at which the intensity of the light is ½ of the maximum intensity.

For example, it is favorable for the second angle $\alpha y$ to be 5 degrees or less. Thereby, for example, the spread of the light is suppressed; and the light can be incident on the one eye 81 of the viewer 80. It is more favorable for the second angle $\alpha y$ to be 3 degrees or less. Thereby, even in the case where the position of the viewer 80 moves, it is easier to maintain the state in which the light is incident on the one eye 81.

For example, such characteristics of the first optical element 10 are obtained by the configurations, etc., recited below.

Figure 7A:
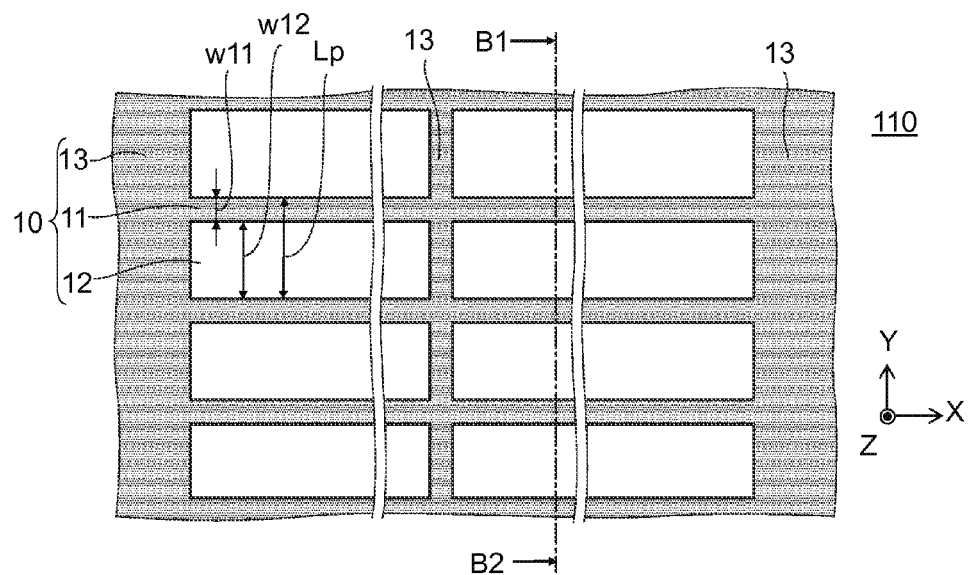
FIG. 7A and FIG. 7B are schematic views showing the optical device according to the first embodiment.
Figure 7B:
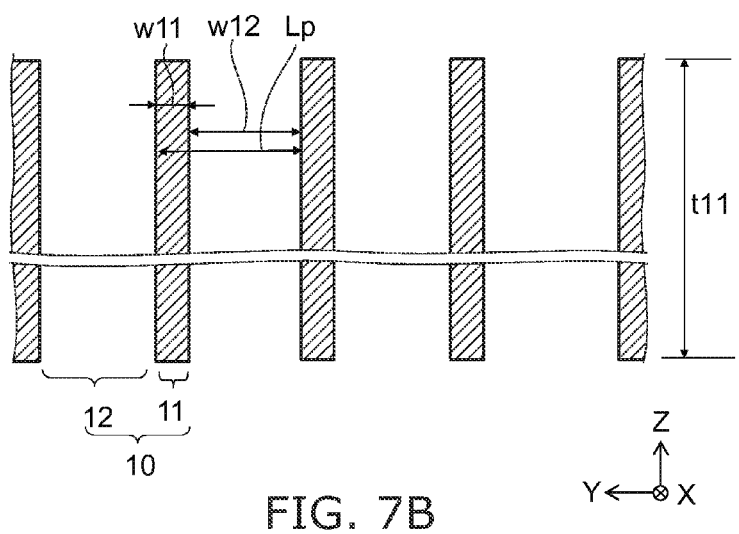

FIG. 7A and FIG. 7B are schematic views illustrating the optical device according to the first embodiment.

FIG. 7A is an enlarged schematic plan view of the first optical element 10. FIG. 7B is a schematic cross-sectional view.

As shown in FIG. 7A, a frame 13 is provided in the first optical element 10. The frame 13 is used as the circumferential edge of the first optical element 10. The multiple non-transmissive portions 11 are connected to the frame 13. The non-transmissive portions 11 extend in the X-axis direction. In the example, metal films are used as the non-transmissive portions 11. The regions between the non-transmissive portions 11 are used as the transmissive portions 12. The transmissive portions 12 are gaps. The transmissive portions 12 are layers of air.

Two ends in the X-axis direction of the non-transmissive portion 11 are connected to the frame 13. The non-transmissive portion 11 deflects easily in the case where the length in the X-axis direction of the non-transmissive portion 11 is long compared to the width w11 of the non-transmissive portion 11. In the example, a connector 14 is provided between the two ends of the non-transmissive portion 11. The connector 14 extends in the Y-axis direction and is connected to the multiple non-transmissive portions 11.

For example, the width w11 (the length in the Y-axis direction) of the non-transmissive portions 11 is about 100 μm. The width w12 (the length in the Y-axis direction) of the transmissive portions 12 is, for example, about 303 μm. A pitch Lp (the pitch of the multiple non-transmissive portions 11) of the multiple transmissive portions 12 is about 403 μm. The width (the width in the X-axis direction) of the connector 14 is about 100 μm. Multiple connectors 14 may be provided. The multiple connectors 14 are arranged in the X-axis direction.

The length (the length in the X-axis direction) of the non-transmissive portion 11 is, for example, about 60 mm. The length in the X-axis direction of the first optical element is, for example, 70 mm. The length in the Y-axis direction of the first optical element 10 is about 110 mm.

As illustrated in FIG. 7B, a thickness t11 (the length in the Z-axis direction) of the non-transmissive portion 11 is about 6 mm. Each of the values recited above is an example; and various modifications are possible in the embodiment.

The thickness of the transmissive portion 12 is substantially the same as the thickness t11 of the non-transmissive portion 11. In the example, the aspect ratio of the transmissive portion 12 is substantially t11/w12, and in the example, is 20. The spread of the light in the Y-axis direction can be small by providing the transmissive portion 12 having such a high aspect ratio. In the example, the angle (the second angle $\alpha y$ of the full width at half maximum) of the spread of the light in the second direction (the Y-axis direction) is about 3 degrees.

In the embodiment, it is favorable for the ratio (the aspect ratio) of the width w12 of the transmissive portion 12 along the second direction (the Y-axis direction) to the thickness t11 (the length in the Z-axis direction) of the non-transmissive portion 11 to be 10 or more. Thereby, the second angle $\alpha y$ can be small; and the target viewing zone is obtained.

The angle (the diffusion angle) of the spread of the light changes due to the aspect ratio. The viewing region (the width of the light incident on the viewer 80) at the prescribed viewing position is determined by the aspect ratio. The aspect ratio may be determined according to the viewing position. For example, in the case where the distance (the viewing distance) between the viewing position and the first optical element 10 is about 100 cm and the width (the lateral width) of the viewing region is 5 cm, the aspect ratio is 100 cm/5 cm=20. In the case where the viewing distance is short, the aspect ratio may be set to be smaller.

On the other hand, the viewing distance becomes excessively short in the case where the aspect ratio is excessively low. In the case where the viewing distance is excessively short, it is difficult to obtain the enhancement effect of the depth perception due to monocular vision. For example, the enhancement effect of the depth perception due to the monocular vision is obtained effectively by setting the viewing distance to be 21.7 cm or more, and more favorably 35.5 cm or more, and even more favorably 63.4 cm or more. It is favorable for the viewing distance to be, for example, about 50 cm or more. By setting the width of the viewing region to be 5 cm so that the light is incident on only one eye, the aspect ratio is 10.

It is favorable for the aspect ratio to be less than 80. In the case where the aspect ratio is excessively high, the difference between the pupil diameter and the width of the viewing region for one eye becomes small; and there are cases where the light-shielding region and the pupil overlap. Therefore, the display becomes dark. Further, the manufacturing is difficult.

For example, the first optical element 10 of the example may be formed by providing openings corresponding to the transmissive portions 12 in a metal plate by etching, etc., and by stacking a plurality of such metal plates. The portion of the metal plate is used as the non-transmissive portions 11. The openings are used as the transmissive portions 12. A light-absorbing film may be formed on the surface of the metal plate as necessary.

Although the transmissive portion 12 is a gap and is an air layer in the example, a light-transmissive resin layer, etc., may be used as the transmissive portion 12 in the embodiment. It is favorable for the transmissive portion 12 to be an air layer because the light absorption can be suppressed.

The first optical element 10 may be obtained by making openings in a thick metal plate. For example, the first optical element 10 may be formed by injection molding. In the embodiment, the method for forming the first optical element 10 is arbitrary.

There are cases where moiré occurs when the first optical element 10 and the second optical element 20 are combined. Examples of moiré will now be described.

Figure 8:
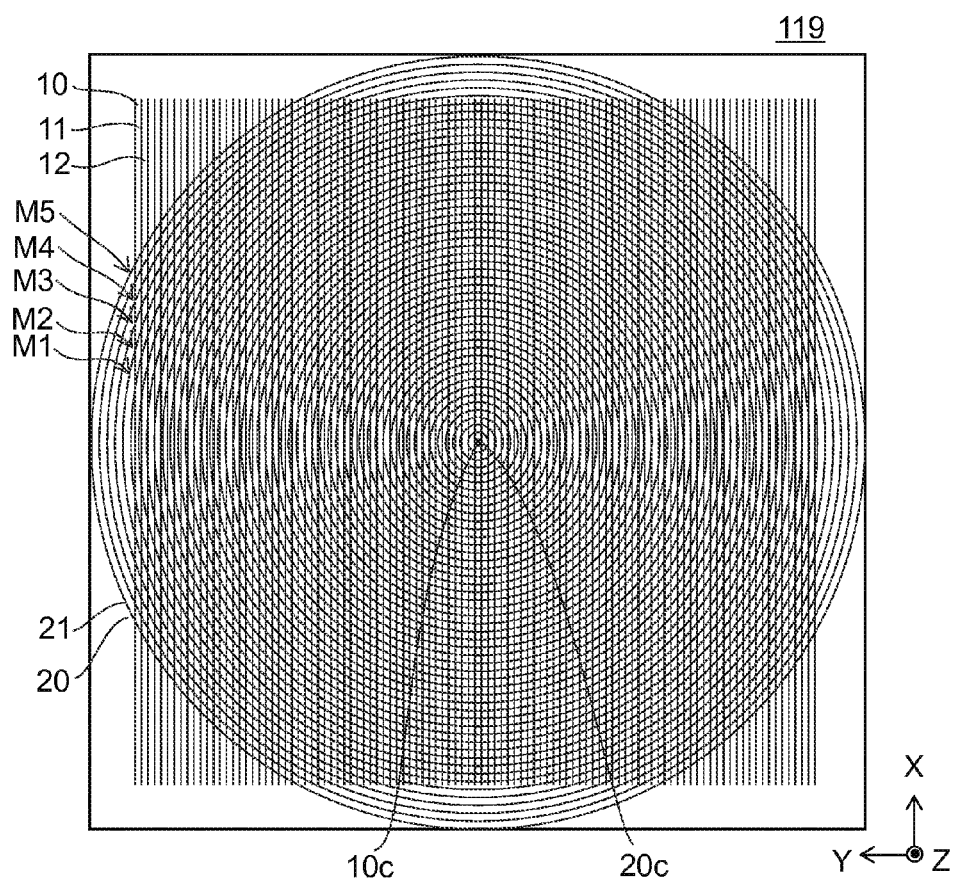
FIG. 8 is a schematic plan view showing characteristics of an optical device.

FIG. 8 is a schematic plan view illustrating characteristics of an optical device.

FIG. 8 illustrates an optical device 119 of a reference example. In the optical device 119, the optical center 20c of the second optical element 20 is disposed at the center 10c of the first optical element 10. It can be seen from the figure that moiré occurs. The moiré includes, for example, first-order to fifth-order moiré M1 to M5, etc. It can be seen from FIG. 8 that the moiré occurs in the Y-axis direction (the lateral direction of FIG. 8).

FIG. 9A to FIG. 9F are schematic views illustrating characteristics of the optical device.

Figure 9A:
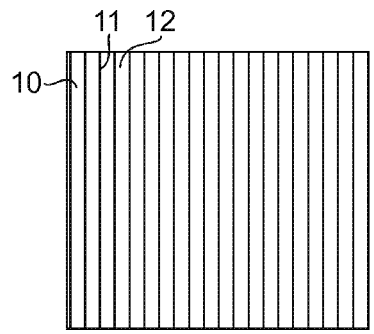
FIG. 9A to FIG. 9F are schematic views showing characteristics of the optical device.
Figure 9B:
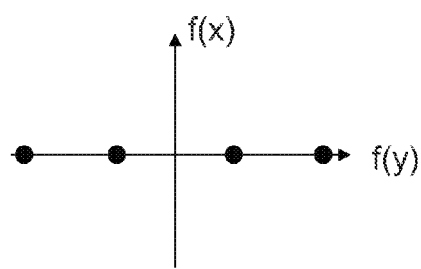
Figure 9C:
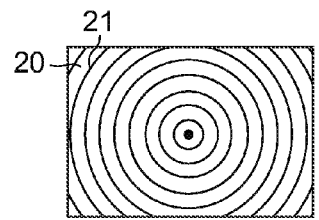
Figure 9D:
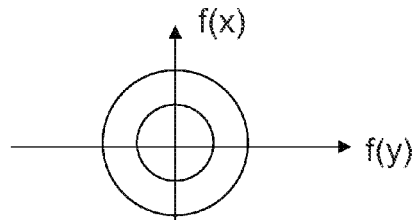
Figure 9E:
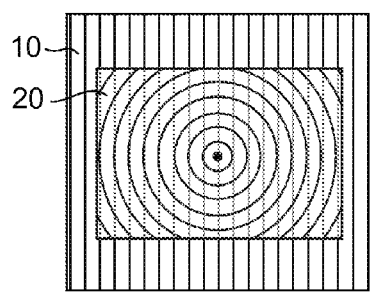
Figure 9F:
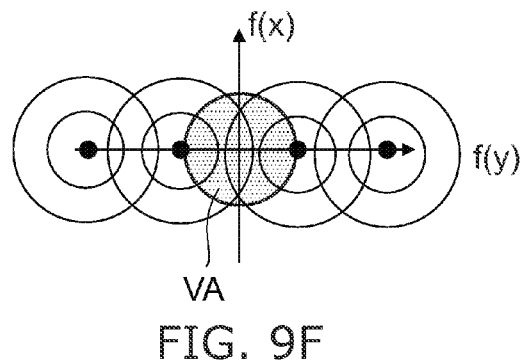

FIG. 9A illustrates a characteristic of the first optical element 10 in real space. FIG. 9B illustrates the characteristic of the first optical element 10 in frequency space. FIG. 9C illustrates a characteristic of the second optical element 20 in real space. FIG. 9D illustrates the characteristic of the second optical element 20 in frequency space. FIG. 9E illustrates the characteristics in real space when the first optical element 10 and the second optical element 20 are stacked. FIG. 9F illustrates the characteristics in frequency space when the first optical element 10 and the second optical element 20 are stacked.

It can be seen from FIG. 9E and FIG. 9F that moiré occurs. As illustrated in FIG. 9F, moiré occurs in a visible region VA.

FIG. 10A to FIG. 10D are schematic plan views illustrating characteristics of the optical device.

In the example shown in FIG. 10A, Cp=1 and Lp=1. In such a case, Cp/Lp=1.

In the example shown in FIG. 10B, Cp=2.5 and Lp=1. In such a case, Cp/Lp=2.5.

In the example shown in FIG. 10C, Cp=1 and Lp=0.5. In such a case, Cp/Lp=2.

In the example shown in FIG. 10D, Cp=1.5 and Lp=1. In such a case, Cp/Lp=1.5.

As shown in these figures, moiré occurs. Examples of the positions where the first-order moiré M1, the second-order moiré M2, and the third-order moiré M3 occur will be described. The angles between the X-axis direction and the multiple protruding portions 21 of the second optical element 20 will now be described.

Figure 11:
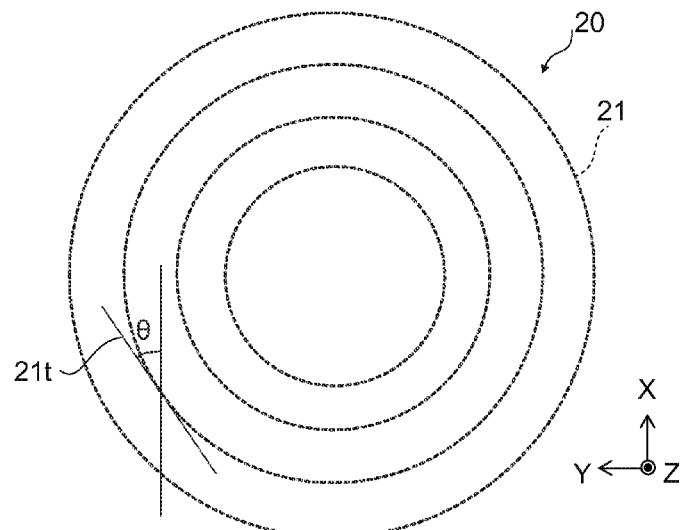
FIG. 11 is a schematic plan view showing the optical device.

FIG. 11 is a schematic plan view illustrating the optical device.

As shown in FIG. 11, an angle θ is the angle between the X-axis direction (the first direction) and tangents 21t of the multiple protruding portions 21 of the second optical element 20. The angle θ changes according to the positions of the protruding portions 21 inside the second optical element 20.

Figure 12:
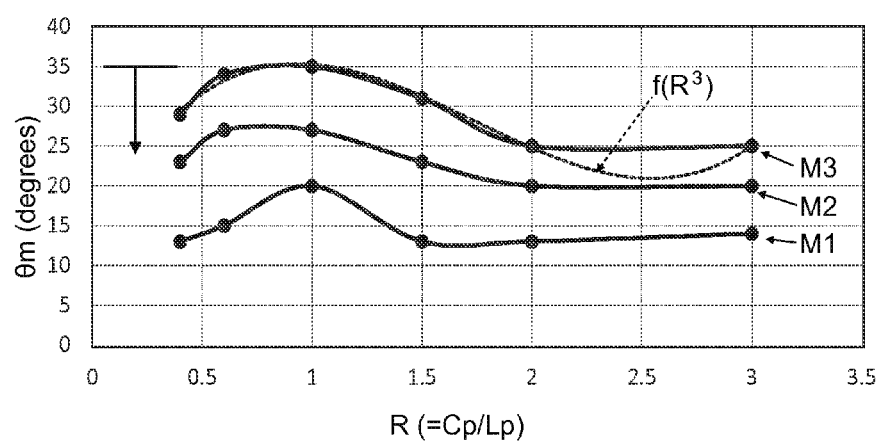
FIG. 12 is a graph of the characteristics of the optical device.

FIG. 12 is a graph of the characteristics of the optical device.

FIG. 12 illustrates the relationship between a ratio R and the angle θ at the positions where the first-order moiré M1, the second-order moiré M2, and the third-order moiré M3 occur. The graph shows an example of six types of samples for which Cp and Lp are modified. In FIG. 12, the horizontal axis is the ratio R. The ratio R is Cp/Lp. The vertical axis is a maximum value θm of the angle θ at the positions where the first-order moiré M1, the second-order moiré M2, and the third-order moiré M3 occur.

For example, in the sample in which the ratio R is 1, the maximum value θm for the first-order moiré M1 is about 20 degrees. In other words, the first-order moiré M1 occurs when the angle θ is about 20 degrees or less. For example, the second-order moiré M2 occurs when the angle θ is about 27 degrees or less. The third-order moiré M3 occurs when the angle θ is 35 degrees or less.

It can be seen from FIG. 12 that the third-order moiré M3 occurs when the angle θ is 35 degrees or less for the six types of samples in which the ratio R is 0.4 to 3. The level of the fourth or higher-order moiré is relatively small and is not easily perceived. Therefore, the moiré that is perceived can be substantially suppressed by suppressing the occurrence of the first-order moiré M1, the second-order moiré M2, and the third-order moiré M3.

In the embodiment, it is favorable for the minimum value of the angle θ between the first direction and the tangents 21t of the arcs 21a (the circular arcs) of the multiple protruding portions 21 to be 35 degrees or more. Thereby, the moiré can be suppressed.

$f(R^3)$ which is an approximation of the characteristic of the third-order moiré using a cubic function is shown in FIG. 12. According to the approximation, $$\theta m = f(R^3) = 6.918R^3 - 36.123R^2 + 49.437R + 15.038.$$

Accordingly, it is favorable for the minimum value (degrees) of the angle θ between the first direction and the tangents 21t of the arcs 21a of the multiple protruding portions 21 to be not less than $6.918R^3 - 36.123R^2 + 49.437R + 15.038$. Thereby, the moiré can be suppressed.

Figure 13:
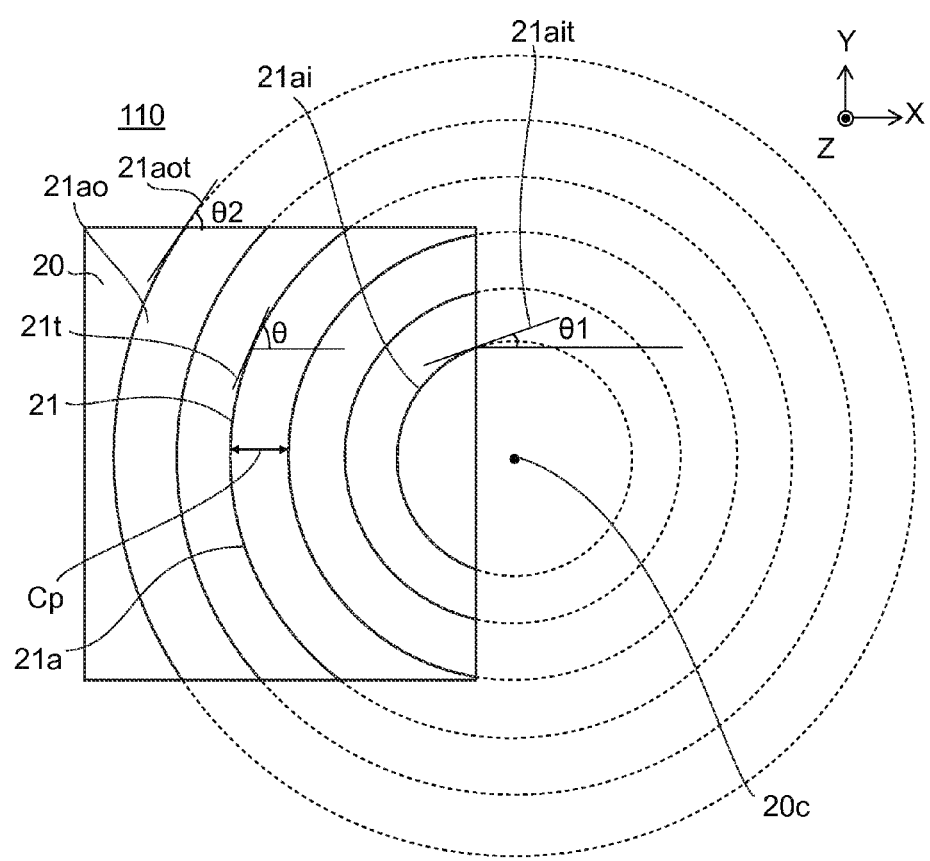
FIG. 13 is a schematic plan view showing the optical device according to the first embodiment.

FIG. 13 is a schematic plan view illustrating the optical device according to the first embodiment.

FIG. 13 illustrates the second optical element 20. The multiple protruding portions 21, i.e., the multiple arcs 21a, are provided in the second optical element 20. The multiple arcs 21a have tangents 21at at positions in the X-Y plane. The angle between the tangent 21at and the first direction (the X-axis direction) is defined as the angle θ. The angle θ changes between the positions of the arcs 21a.

For example, an arc 21ai on the inner side has a tangent 21ait. An angle θ1 between the tangent 21ait and the X-axis direction changes between positions on the arc 21ai of the inner side. The angle θ1 is large at the center of the arc 21ai of the inner side and small at the ends of the arc 21ai of the inner side.

For example, an arc 21ao on the outer side has a tangent 21aot. An angle θ2 between the tangent 21aot and the X-axis direction changes between positions on the arc 21ao of the outer side. The angle θ2 is large at the center of the arc 21ao of the outer side and small at the ends of the arc 21ao of the outer side. The angle θ2 is smaller than the angle θ1.

For example, in the embodiment, the angle θ2 is set to be greater than 35 degrees. In such a case, for example, the angle θ1 also is greater than 35 degrees. In the embodiment, the minimum value of the angle θ for the arc 21a of any protruding portion 21 in the second optical element 20 is, for example, 35 degrees or more. Thereby, the moiré substantially is not perceived.

Second Embodiment

Figure 14:
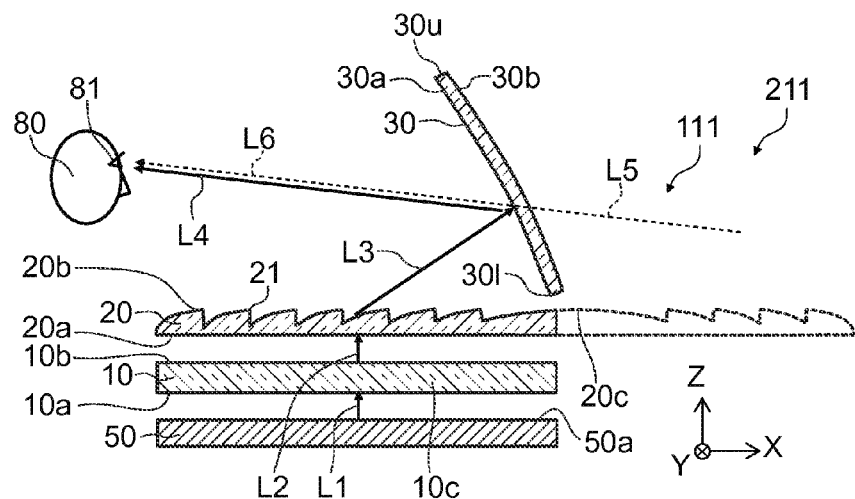
FIG. 14 is a schematic cross-sectional view showing an optical device according to a second embodiment.

FIG. 14 is a schematic cross-sectional view illustrating an optical device according to a second embodiment.

As shown in FIG. 14, the first optical element 10 and the second optical element 20 are provided also in a display system 211 and the optical device 111 according to the embodiment. The third optical element 30 may be included in the optical device 111 and may be provided separately from the optical device 111. In the embodiment, the third optical element 30 has optical power. Otherwise, the embodiment may be similar to the first embodiment; and a description is therefore omitted.

For example, the fifth surface 30a of the third optical element 30 has a concave configuration. For example, the third optical element 30 is a light-concentrating element. The fourth light L4 that is reflected by the third optical element 30 is condensed by the power of the third optical element 30. The viewer 80 views the fourth light L4 that is condensed. The display image that is included in the fourth light L4 is viewed as being enlarged.

Figure 15:
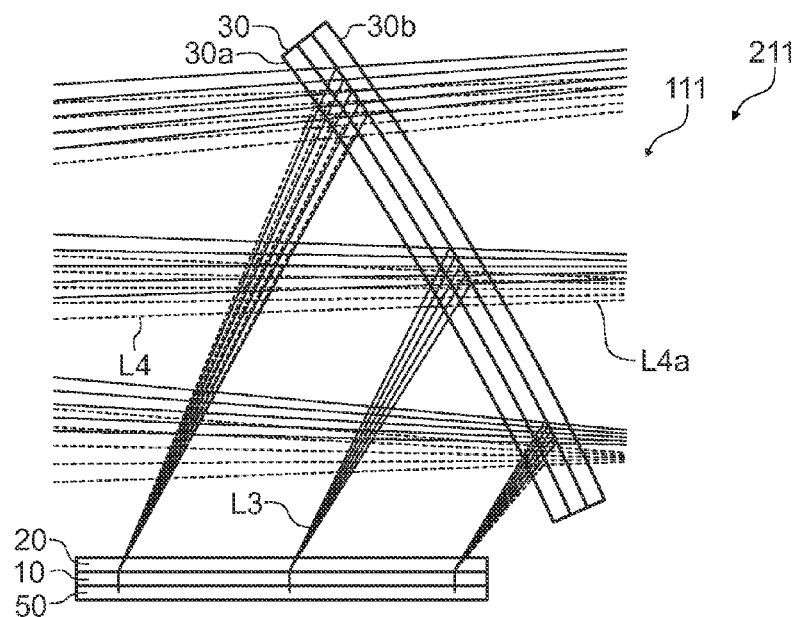
FIG. 15 is a schematic cross-sectional view showing the optical device according to the second embodiment.

FIG. 15 is a schematic cross-sectional view illustrating the optical device according to the second embodiment.

As shown in FIG. 15, the third light L3 is reflected by the third optical element 30 to become the fourth light L4. A virtual image L4a that is formed of the fourth light L4 is viewed by the viewer 80.

In the case where the third optical element 30 has power, for example, the light-condensing characteristics (the power) of the second optical element 20 are designed to match the power of the third optical element 30.

Third Embodiment

Figure 16:
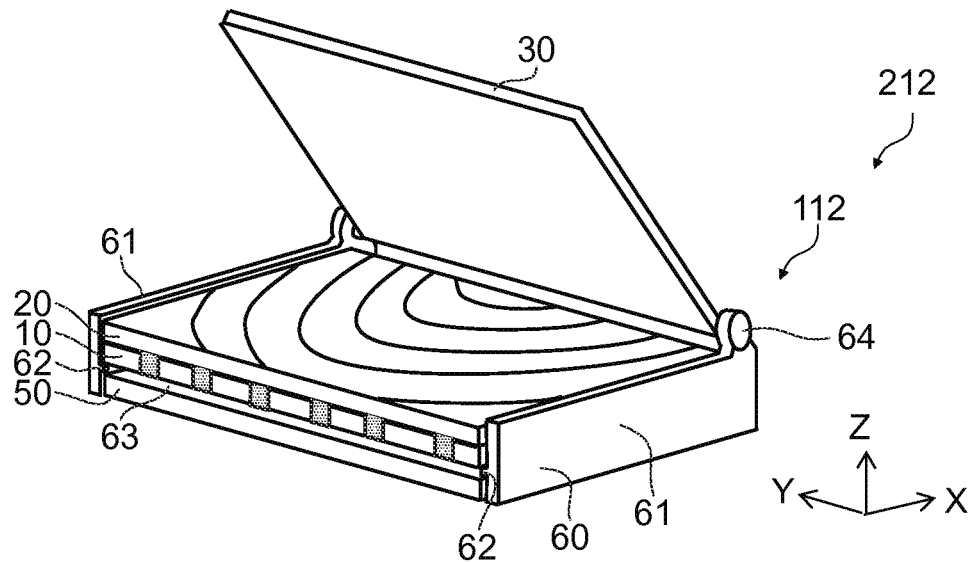
FIG. 16 is a schematic perspective view showing an optical device according to a third embodiment.

FIG. 16 is a schematic perspective view illustrating an optical device according to a third embodiment.

As shown in FIG. 16, a holder 60 is further provided in a display system 212 and the optical device 112 according to the embodiment. Otherwise, the embodiment may be similar to the first embodiment or the second embodiment; and a description is therefore omitted.

The holder 60 is connected to the first optical element 10 and the second optical element 20. The holder 60 holds the first optical element 10 and the second optical element 20 as a single body. The holder 60 includes, for example, a side surface portion 61, a protruding portion 62, and a coupling portion 64. The side surface portion 61 opposes the side surface of the first optical element 10 and the side surface of the second optical element 20. The bottom of the first optical element 10 is held by the protruding portion 62. The coupling portion 64 is linked to the side surface portion 61. The coupling portion 64 is coupled to the third optical element 30. The third optical element 30 is held to be tilted toward the first optical element 10 by the coupling portion 64.

Two side surface portions 61 are provided in the holder 60. The two side surface portions 61 are separated from each other in the Y-axis direction. The protruding portion 62 is provided in each of the two side surface portions 61. A space 63 is provided at the lower portion of the first optical element 10 between the two side surface portions 61. The display 50 is inserted into the space 63. The display 50 may have a state of being disposed inside the space 63 and a state of being removed from the space 63.

The holder 60 regulates the spatial arrangement between the display 50 and at least one of the first optical element 10 or the second optical element 20. For example, the positions of the first optical element 10 and the second optical element 20 are regulated by the two side surface portions 61 and the two protruding portions 62. The position of the display 50 is regulated by the two side surface portions 61. The holder 60 holds the display 50 attachably and removably.

An example of a state of use of the optical device according to the embodiment will now be described. An example using the optical device 110 will now be described. Any optical device or modification of the optical devices according to the embodiments recited above is applicable to the following description.

Figure 17:
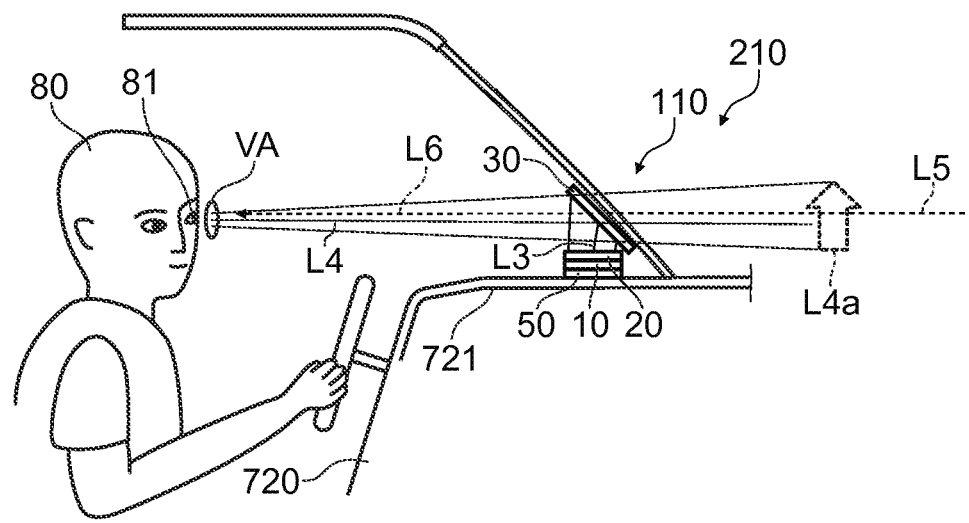
FIG. 17 is a schematic cross-sectional view showing the state of use of the optical device according to the embodiment.

FIG. 17 is a schematic cross-sectional view illustrating the state of use of the optical device according to the embodiment.

As shown in FIG. 17, the optical device 110 according to the embodiment may be used by being mounted in a moving body 720. The moving body 720 is arbitrary, e.g., a vehicle, a train, a ship, an aircraft, etc. The viewer 80 rides in the moving body 720. The moving body 720 includes a control panel 721 (a dashboard, etc.). The display 50 is disposed on the control panel 721; and the first optical element 10 and the second optical element 20 are disposed on the display 50.

The spread of the fourth light L4 that is reflected by the third optical element 30 is limited. The luminous flux of the fourth light L4 forms the visible region VA. The distance between the left and right eyes (pupils) of the viewer 80 are, for example, not less than 60 mm and not more than 75 mm, e.g., about 65 mm. The width of the visible region VA in the lateral direction is, for example, 75 mm or less, e.g., 65 mm or less. In other words, the width of the fourth light L4 in the lateral direction at the position of the eye 81 of the viewer 80 is 75 mm or less, e.g., 65 mm or less. A state is formed in which the fourth light L4 is incident on the one eye 81 of the viewer 80 but not incident on the other eye. The viewer 80 views the virtual image L4a formed of the fourth light L4 using the one eye 81.

The fifth light L5 that includes the background image passes through the third optical element 30 and is incident on both eyes of the viewer 80 as the sixth light L6. The background image includes an image of the road, etc., frontward of the moving body 720 (a vehicle or the like).

The display image includes, for example, shapes such as arrows, characters, and the like for navigation, etc. Because the display image is superimposed onto the background image and perceived by the one eye 81, the depthward position of the display image is perceived as being enhanced.

According to the embodiment, for example, the portable display 50 (e.g., a smartphone or the like) can be used inside a vehicle as, for example, a navigation device. The display 50 is disposed on the control panel 721 and is disposed to be substantially horizontal. The third optical element 30 is disposed to be tilted to view the background image via the third optical element 30. The second optical element 20 is used to cause the light from the display 50 which is disposed horizontally to be incident on the third optical element 30 which is disposed to be tilted. Also, the first optical element 10 is used to limit the spread of the light to cause the light to be incident on the one eye 81 of the viewer 80. The second optical element 20 is a light-concentrating element and controls the spread of the light.

According to the embodiments, an optical device that enables new applications of displays can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in optical devices such as a first optical element, a second optical element, a third optical element, a holder, device, and a display, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all optical devices practicable by an appropriate design modification by one skilled in the art based on the optical devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An optical device, comprising:
   a first optical element having a first surface and a second surface, a first light emitted by a display being incident on the first surface, the first optical element including a plurality of transmissive portions and a plurality of non-transmissive portions, each of the transmissive portions extending in a first direction parallel to the first surface, the non-transmissive portions being respectively disposed in regions between the transmissive portions, a light transmittance of the non-transmissive portions being lower than a light transmittance of the transmissive portions; and
   a second optical element, a second light emitted from the second surface being incident on the second optical element, the second optical element emitting a third light by condensing the second light, an optical axis of the third light being tilted with respect to an optical axis of the second light in a plane parallel to the first direction, wherein
   the second optical element has a third surface and a fourth surface, the second light being incident on the third surface,
   the second optical element includes a plurality of protruding portions provided on one or both of the third surface and the fourth surface,
   each of the protruding portions has an arc shape when projected onto the third surface,
   an optical center of the second optical element is separated from a center of the first optical element in the first direction in a plane parallel to the first surface,
   the second optical element emits the third light toward a third optical element provided to be tilted with respect to the first surface,
   the third optical element has a fifth surface and a sixth surface,
   the third light is reflected by the fifth surface, and
   light including a background image is incident on the sixth surface, passes through the third optical element, is emitted from the fifth surface, and travels toward a viewer of the display.

2. The device according to claim 1, wherein a minimum value of angles between the first direction and tangents of the arcs of the protruding portions is 35 degrees or more.

3. The device according to claim 1, wherein a minimum value (degrees) of angles between the first direction and tangents of the arcs of the protruding portions is not less than $6.918R^3-36.123R^2+49.437R+15.038$, where a pitch of the transmissive portions is Lp, a pitch of the protruding portions is Cp, and $R=Lp/Cp$.

4. The device according to claim 1, wherein the protruding portions form a Fresnel lens.

5. The device according to claim 1, wherein the third light is reflected by the third optical element and is incident on one eye of the viewer.

6. The device according to claim 1, wherein
   the third optical element includes a lower portion and an upper portion,
   a distance between the upper portion and the first optical element is longer than a distance between the lower portion and the first optical element, and
   a distance along the first direction between the upper portion and the optical center of the second optical element is longer than a distance along the first direction between the lower portion and the optical center of the second optical element.

7. The device according to claim 1, wherein
   the third optical element includes a lower portion and an upper portion, a distance between the upper portion and the first optical element is longer than a distance between the lower portion and the first optical element, and an orientation of a travel direction of the third light between the second optical element and the third optical element when projected onto the first surface is the same as an orientation of a direction from the upper portion toward the lower portion when projected onto the first surface.

8. The device according to claim 1, wherein
a first angle of a full width at half maximum of the second light in the first direction is larger than a second angle of a full width at half maximum of the second light in a direction perpendicular to the first direction.

9. The device according to claim 8, wherein the second angle is 5 degrees or less.

10. The device according to claim 8, wherein the second angle is 3 degrees or less.

11. The device according to claim 1, further comprising a holder connected to the first optical element and the second optical element,
the holder regulating a spatial arrangement between the display and one or both of the first optical element and the second optical element.

12. The device according to claim 11, wherein the holder holds the display attachably and removably.

13. The device according to claim 1, wherein each of the transmissive portions includes one or both of a transparent resin or transparent glass.

14. The device according to claim 13, wherein each of the non-transmissive portions includes a metal.

15. The device according to claim 1, wherein
the transmissive portions are arranged in a second direction parallel to the first surface and perpendicular to the first direction, and
a ratio of a width along the second direction of one of the transmissive portions to a thickness in a third direction of one of the non-transmissive portions is 10 or more, the third direction being perpendicular to the first direction and perpendicular to the second direction.

16. The device according to claim 1, wherein the second optical element makes the optical axis of the third light to be tilted with respect to the optical axis of the second light in a plane parallel to the first direction and parallel to the optical axis of the second light.

* * * * *